(12) United States Patent
Akasaka

(10) Patent No.: US 7,274,503 B2
(45) Date of Patent: Sep. 25, 2007

(54) DISTRIBUTED RAMAN AMPLIFICATION

(75) Inventor: Youichi Akasaka, Foster City, CA (US)

(73) Assignee: Sprint Communications Company L.P., Overland Park, KS (US)

(*) Notice: Subject to any disclaimer, the term of this patent is extended or adjusted under 35 U.S.C. 154(b) by 633 days.

(21) Appl. No.: 10/655,901

(22) Filed: Sep. 5, 2003

(65) Prior Publication Data
US 2005/0052728 A1    Mar. 10, 2005

(51) Int. Cl.
*H01S 3/00* (2006.01)
(52) U.S. Cl. ...................................... 359/334
(58) Field of Classification Search ................ 359/334
See application file for complete search history.

(56) References Cited

U.S. PATENT DOCUMENTS

| | | | |
|---|---|---|---|
| 6,344,922 B1* | 2/2002 | Grubb et al. | 359/334 |
| 6,529,315 B2* | 3/2003 | Bartolini et al. | 359/334 |
| 6,603,593 B2* | 8/2003 | Fidric et al. | 359/334 |
| 2001/0040719 A1* | 11/2001 | Okuno et al. | 359/334 |
| 2002/0102051 A1 | 8/2002 | Tsuzaki et al. | 385/24 |
| 2002/0109906 A1 | 8/2002 | Grubb et al. | |
| 2003/0133179 A1* | 7/2003 | Islam et al. | 359/334 |
| 2004/0190118 A1* | 9/2004 | Akasaka | 359/333 |
| 2005/0078351 A1* | 4/2005 | Avallone et al. | 359/334 |

OTHER PUBLICATIONS

Agrawal et al. Fiber-Optic Communication Systems. 3rd Edition. Wiley-Interscience. 2002. pp. 243-246.*
Fludger et al. Pump to Signal RIN transfer in Raman Fibre Amplifiers. Electronics Letters. Jan. 4, 2001. vol. 37. No. 1.*
Schulze, E., et al. "10 Gb/s NRZ Transmission over 1800 km Multiple Pumped Distributed Raman Amplified Transmission Link without Lumped Amplifiers," Proc. 27th European Conference on Optical Communications, ECOC'01-Amsterdam, vol. 2, Sep. 30, 2001, pp. 160-161, XP010582611.

* cited by examiner

*Primary Examiner*—Deandra M Hughes

(57) ABSTRACT

A communication system for distributed Raman amplification of optical signals is disclosed. The communication system comprises a first fiber span, a second fiber span, and an amplifier system. The amplifier system generates a light beam and splits the light beam into a first portion and a second portion. The amplifier system transfers the first portion of the light beam onto the first fiber span so that the first portion of the light beam backward propagates over the first fiber span. The amplifier system transfers the second portion of the light beam onto the second fiber span so that the second portion of the light beam forward propagates over the second fiber span.

16 Claims, 3 Drawing Sheets

DISTRIBUTED RAMAN AMPLIFICATION

BACKGROUND OF THE INVENTION

1. Field of the Invention

The invention is related to the field of communication systems, and in particular, to systems and methods of providing distributed Raman amplification of optical signals.

2. Statement of the Problem

Many communication companies use optical networks for transmitting data because of its high-bandwidth capacity. Optical networks reliably transport optical signals over long distances. Optical networks include transmission fiber, transmitters, receivers, repeaters, etc. As the optical signals travel over the transmission fiber, the optical signals disperse or otherwise attenuate due to Rayleigh scattering. The attenuation may be recovered by an optical amplifier.

Optical amplifiers may be discrete amplifiers or distributed amplifiers. A distributed amplifier uses the transmission fiber carrying the optical signals as a gain medium. A discrete amplifier does not use the actual transmission fiber as the gain medium, but is a separate component that includes a span of rare-earth doped fiber, Dispersion Compensating Fiber (DCF), Highly Nonlinear Fiber (HNF), or another type of fiber as the gain medium.

In a distributed amplifier, a pump laser transmits a laser onto the transmission fiber concurrently as the optical signals travel over the fiber. The pump laser generally backward pumps the laser onto the transmission fiber. Other distributed amplifiers have a backward pumping laser and a forward pumping laser. The properties of the transmission fiber act to absorb the pumped laser and generate a gain in the optical signals due to the Raman Effect. The gain range of the distributed amplifier is flexible and depends on the wavelength of the pump laser. The pump laser amplifies wavelengths at one Raman Stokes shift away from the laser wavelength. A first order Raman Stokes shift comprises the wavelengths about 100 nanometer (nm) longer than the pump laser wavelength in glass fiber. For instance, a 1455 nm pump laser wavelength amplifies optical signals having wavelengths around 1550 nm. The gain bandwidth is about 30 nm centered about the 1550 nm wavelength.

One problem with current distributed amplifiers is that high pump powers are needed to achieve the desired gain. The pump power for distributed amplification can range from 500 milliwatts (mW) to over 1 Watt. As a comparison, a discrete Erbium-Doped Fiber Amplifier (EDFA) may have pump powers around 100 mW to achieve the same gain. Unfortunately, the high pump powers may increase the chance of connector burns, fiber fuse, and ignition of a fire. The high pump powers can also be dangerous for the operators, as the high pump powers can be harmful to the eyes of the operators and can cause severe burns.

SUMMARY OF THE SOLUTION

The invention helps solve the above problems with systems and method described herein. One example is a communication system that comprises a first fiber span, a second fiber span, and an amplifier system. The amplifier system generates a light beam and splits the light beam into a first portion and a second portion. The amplifier system transfers the first portion of the light beam onto the first fiber span so that the first portion of the light beam backward propagates over the first fiber span. The amplifier system transfers the second portion of the light beam onto the second fiber span so that the second portion of the light beam forward propagates over the second fiber span.

In another example, the amplifier system comprises a splitter system and a pump system. The pump system generates the light beam and transmits the light beam to the splitter system. The splitter system splits the light beam into the first portion and the second portion. The splitter system transfers the first portion of the light beam onto the first fiber span so that the first portion of the light beam backward propagates over the first fiber span. The splitter system transfers the second portion of the light beam onto the second fiber span so that the second portion of the light beam forward propagates over the second fiber span.

Splitting the light beam into portions may advantageously reduce the local pump power being injected into the fiber spans while still providing the desired gain. The lower local pump power may be safer for the operators of the communication system.

The invention may include other examples described below.

DESCRIPTION OF THE DRAWINGS

The same reference number represents the same element on all drawings.

DETAILED DESCRIPTION OF THE INVENTION

Figure 1:
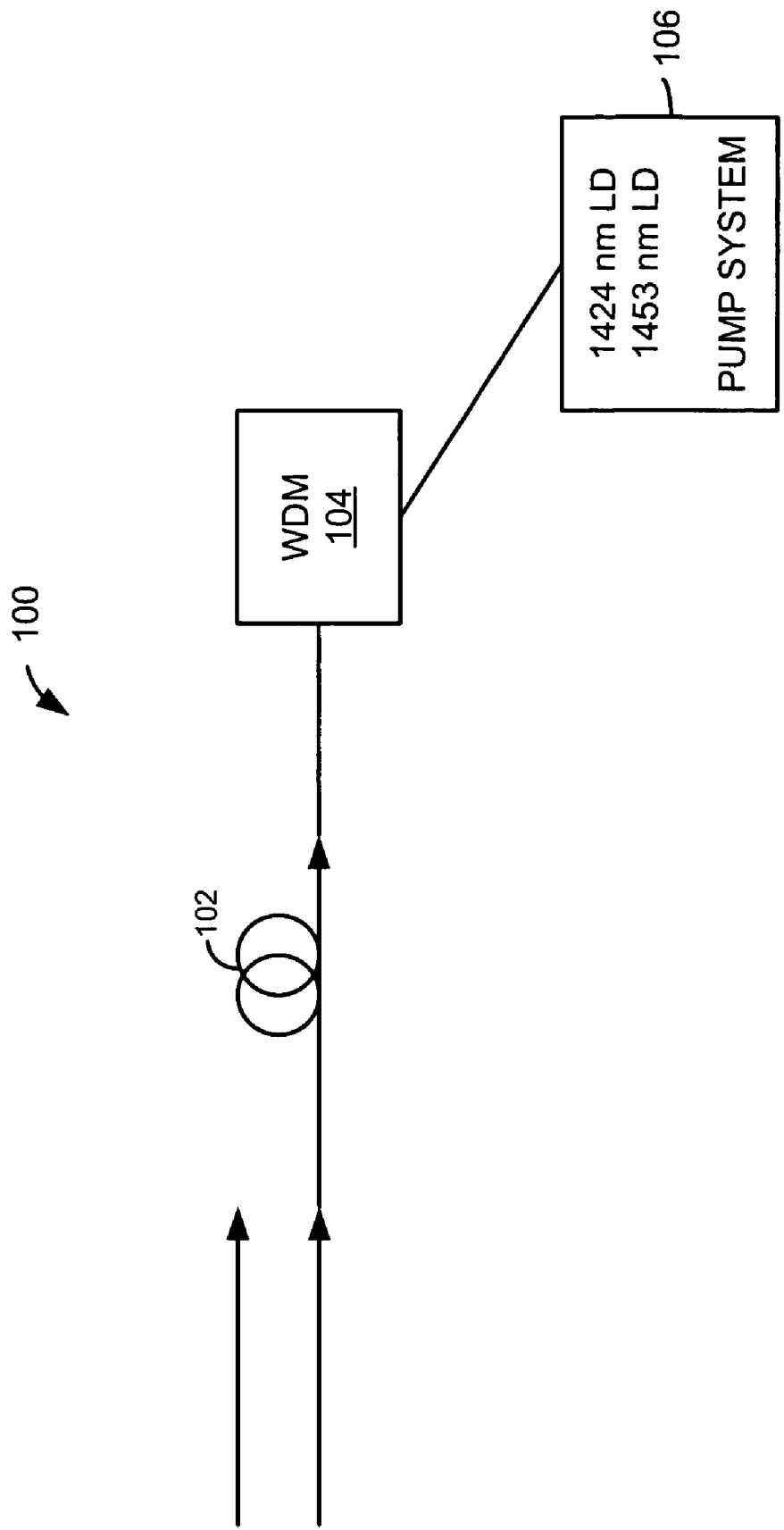
FIG. 1 illustrates a communication system for distributed Raman amplification of optical signals in the prior art.
Figure 2:
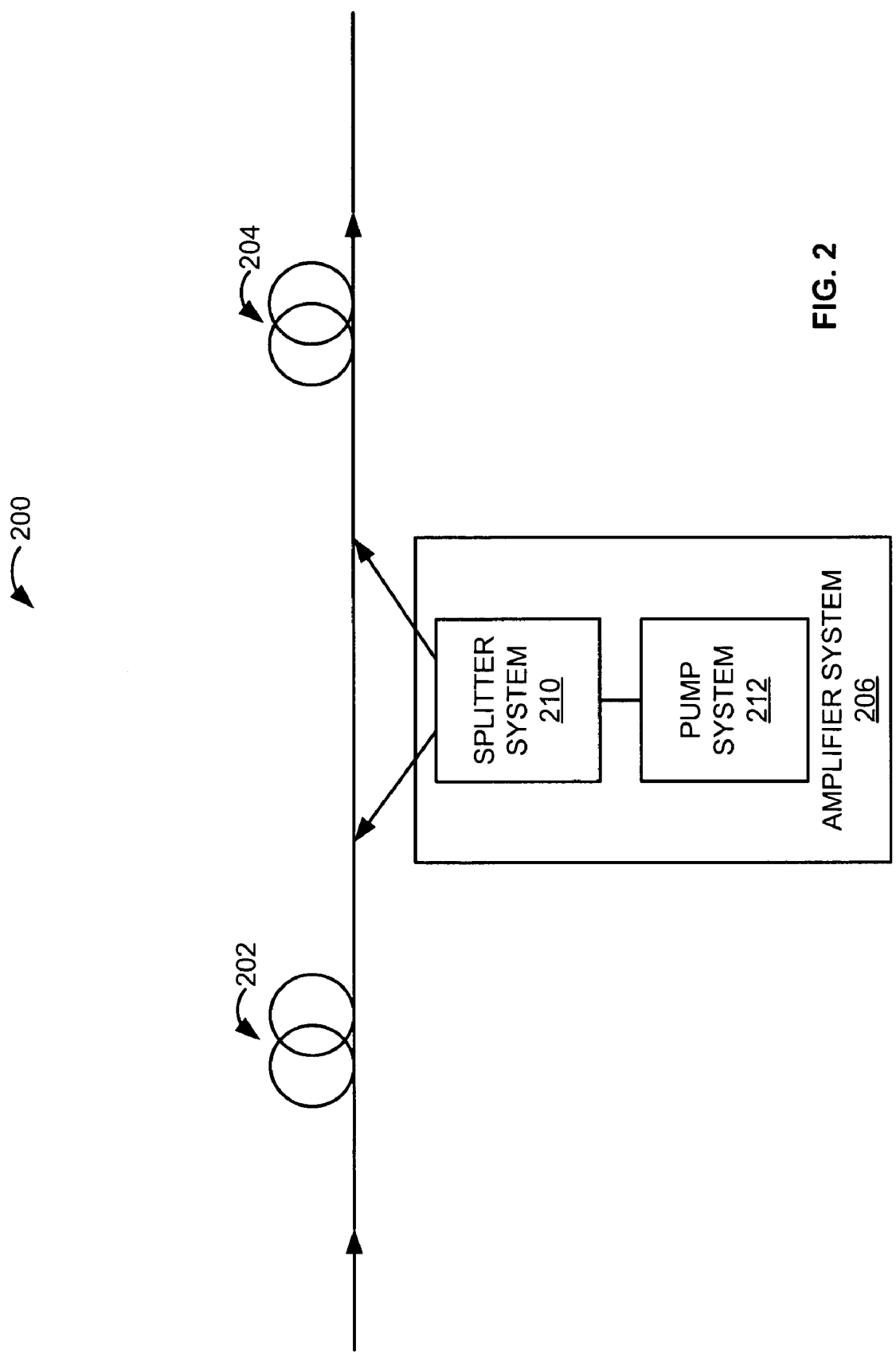
FIG. 2 illustrates a communication system for distributed Raman amplification of optical signals in an example of the invention.
Figure 3:
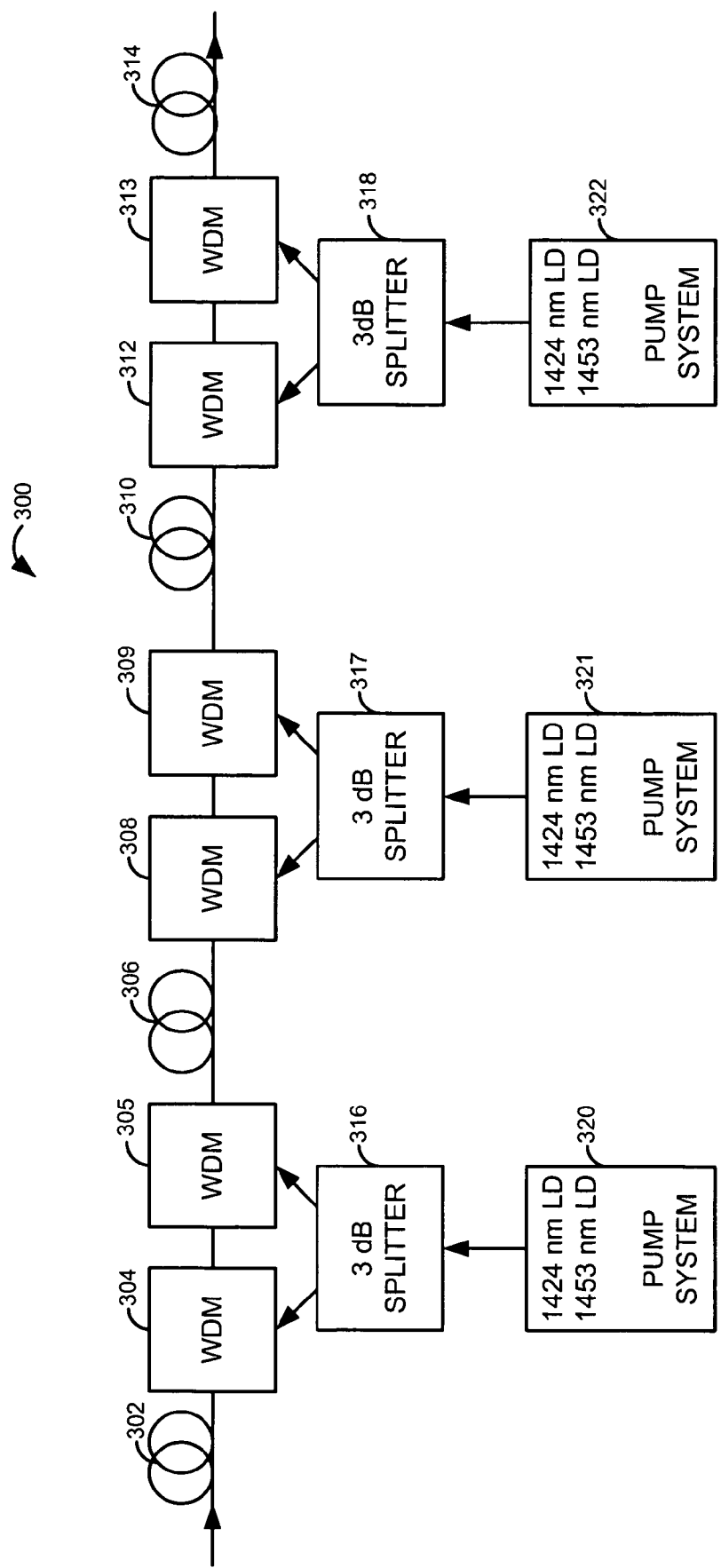
FIG. 3 illustrates a communication system for distributed Raman amplification of optical signals in another example of the invention.

FIG. 1 illustrates a prior art example to help clarify the invention. FIGS. 2-3 and the following description depict specific examples of the invention to teach those skilled in the art how to make and use the best mode of the invention. For the purpose of teaching inventive principles, some conventional aspects of the invention have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Prior Art Communication System—FIG. 1

FIG. 1 illustrates a communication system 100 for distributed Raman amplification of optical signals in the prior art. Communication system 100 comprises a fiber span 102, a Wavelength Division Multiplexer (WDM) 104, and a pump system 106. Pump system 106 is coupled to WDM 104. WDM 104 is coupled to fiber span 102.

Pump system 106 is comprised of a 1424 nm laser diode and a 1453 nm laser diode. Pump system 106 has a combined pump power of 535.6 mW, with the 1424 nm laser diode having a pump power of 257 mW and the 1453 nm laser diode having a pump power of 278.6 mW.

In operation, fiber span 102 receives optical signals. The optical signals have 200 GHz spacing and with an input power of −6 dBm per channel. The 1424 nm laser diode and the 1453 nm laser diode backward pump the 1424 nm and the 1453 nm laser beams onto fiber span 102 through WDM 104. The laser beams generate about a 10 dB gain in the C-band due to the Raman Effect.

One problem with communication system 100 is high pump power is pumped into fiber span 102. In this example, 535.6 mW of pump power is pumped into fiber span 102, which may be a dangerous amount.

Lasers may be labeled in classes. A class 1 laser is considered safe and is used to read DVDs and used for laser printers. A class 2 laser comprises visible light between 400 nm and 780 nm with an upper power limit of 1 mW. Momentary viewing of a class 2 laser is not dangerous, but extended viewing may be dangerous. An example of a class 2 laser is a bar code scanner. A class 3A laser comprises invisible light less than 0.5 W (−3 dBm). A class 3A laser can cause permanent eye damage if eye protection is not used. A class 3B laser also comprises light with a power less than 0.5 W (27 dBm). A class 3B laser may cause injuries to the eye and skin due to direct exposure, and eye protection is needed. A class 4 laser comprises light with a power greater than 0.5 W. A class 4 laser is hazardous to eyes and skin due to direct or diffused exposure. Protective eyewear is needed when working with a class 4 laser. A class 4 laser may also be a fire danger.

As stated above, the laser diodes pump 535.6 mW of power into fiber span 102. 535.6 mW of power can be classified as either a class 3B laser or a class 4 laser. A fiber cut or other damage to the fiber or connectors may cause the high power laser (over 500 mW) to be emitted out of the fiber. This can be very dangerous for the operators of communication network 100 if they come into contact with the emitted laser. Operators of communication network 100 must wear protective eyewear or severe eye damage may result. The high power laser can also cause severe burns to the skin and can ignite fires.

EXAMPLE #1

FIG. 2

FIG. 2 illustrates a communication system 200 for distributed Raman amplification of optical signals in an example of the invention. Communication system 200 comprises fiber spans 202, 204 and an amplifier system 206. Amplifier system 206 is coupled to fiber span 202 and fiber span 204. Fiber spans 202 and 204 each comprise a length of optical fiber configured to transport an optical signal. An example of fiber spans 202 and 204 comprises a length of single mode fiber (SMF). Communication system 200 may include other components that are left out for the sake of brevity.

In operation, amplifier system 206 generates a light beam. Amplifier system 206 splits the light beam into a first portion and a second portion. Amplifier system 206 transfers the first portion of the light beam onto fiber span 202 so that the first portion of the light beam backward propagates over the fiber span 202. Amplifier system 206 transfers the second portion of the light beam onto fiber span 204 so that the second portion of the light beam forward propagates over fiber span 204. Based on this disclosure, those skilled in the art will appreciate how to modify existing communication systems to make communication system 200.

The first portion of the light beam helps to amplify optical signals traveling over fiber span 202. The first portion of the light beam may comprise between about 40 to 60 percent of the power of the light beam, depending on implementation. The second portion of the light beam helps to amplify optical signals traveling over fiber span 204.

When configured as described in this example, communication system 200 advantageously reduces the local pump power being injected into fiber spans 202 and 204 while still providing the desired gain. The local pump power being injected into fiber span 202 is the first portion of the light beam. The first portion of the light beam may be a lower power than the light beams currently used, and the lower local pump power may be safer for the operators of communication system 200.

In one example, amplifier system 206 comprises a splitter system 210 and a pump system 212. Pump system 212 generates the light beam. Pump system 212 transmits the light beam to splitter system 210. Examples of pump system 212 comprise a Raman fiber laser and a laser diode. An example of a light beam comprises a laser beam. Splitter system 210 receives the light beam. Splitter system 210 splits the light beam into the first portion and the second portion. Splitter system 210 transfers the first portion of the light beam onto fiber span 202 so that the first portion of the light beam backward propagates over the fiber span 202. Splitter system 210 transfers the second portion of the light beam onto fiber span 204 so that the second portion of the light beam forward propagates over fiber span 204. Examples of splitter system 210 comprise a 50:50 splitter, a 45:55 splitter, a 40:60 splitter, etc.

EXAMPLE #2

FIG. 3

FIG. 3 illustrates a communication system 300 for distributed Raman amplification of optical signals in an example of the invention. Communication system 300 includes fiber spans 302, 306, 310, and 314. The fiber spans 302, 306, 310, and 314 are configured to transfer optical signals between transmitters and receivers (not shown) in communication system 300. Communication system 300 also includes Wavelength Division Multiplexers (WDM) 304, 305, 308, 309, 312 and 313, splitters 316-318, and pump systems 320-322. WDM 304 is coupled to fiber span 302. WDMs 305 and 308 are coupled to fiber span 306. WDMs 309 and 312 are coupled to fiber span 310. WDM 313 is coupled to fiber span 314. Splitter 316 is coupled to WDMs 304-305. Splitter 317 is coupled to WDMs 308-309. Splitter 318 is coupled to WDMs 312-313. Pump system 320 is coupled to splitter 316. Pump system 321 is coupled to splitter 317. Pump system 322 is coupled to splitter 318. Communication system 300 may include other components that are left out for the sake of brevity.

Pump systems 320-322 may each comprise a 1424 nm laser diode and a 1453 nm laser diode for this example. Pump systems 320-322 may each have a pump power of about 529.6 mW. Splitters 316-318 may comprise 3 dB splitters for this example. Fiber spans 302, 306, 310, and 314 may each comprise single mode fibers have a length between about 50 km and 120 km.

In operation, fiber span 302 receives optical signals. The optical signals have an input power between −6 dBm and −10 dBm per channel. The optical signals propagate over fiber spans 302, 306, 310, and 314. Concurrently as the optical signals travel over fiber spans 302, 306, 310, and 314, the following takes place. Pump system 320 transmits a laser beam to splitter 316. The laser beam has a power of about 529.6 mW. Splitter 316 receives the laser beam. Splitter 316 splits the laser beam into a 269.2 mW portion and a 260 mW portion. Splitter 316 transfers the 269.2 mW portion to WDM 304, and WDM 304 transfers the 269.2 mW portion onto fiber span 302 so that the 269.2 mW portion backward propagates over fiber span 302. Splitter 316 transfers the 260 mW portion to WDM 305, and WDM 305 transfers the 260 mW portion onto fiber span 306 so that the 260 mW portion forward propagates over fiber span 306.

Pump system 321 transmits a laser beam to splitter 317. The laser beam has a power of about 529.6 mW. Splitter 317 receives the laser beam. Splitter 317 splits the laser beam into a 269.2 mW portion and a 260 mW portion. Splitter 317 transfers the 269.2 mW portion to WDM 308, and WDM 308 transfers the 269.2 mW portion onto fiber span 306 so that the 269.2 mW portion backward propagates over fiber span 306. Splitter 317 transfers the 260 mW portion to WDM 309, and WDM 309 transfers the 260 mW portion onto fiber span 310 so that the 260 mW portion forward propagates over fiber span 310.

Pump system 322 transmits a laser beam to splitter 318. The laser beam has a power of about 529.6 mW. Splitter 318 receives the laser beam. Splitter 318 splits the laser beam into a 269.2 mW portion and a 260 mW portion. Splitter 318 transfers the 269.2 mW portion to WDM 312, and WDM 312 transfers the 269.2 mW portion onto fiber span 310 so that the 269.2 mW portion backward propagates over fiber span 310. Splitter 318 transfers the 260 mW portion to WDM 313, and WDM 313 transfers the 260 mW portion onto fiber span 314 so that the 260 mW portion forward propagates over fiber span 314.

Pump systems 320-322 amplify the optical signals traveling over fiber spans 302, 306, 310, and 314. For instance, in fiber span 306, the 269.2 mW portion backward propagating over fiber span 306 and the 260 mW portion forward propagating over fiber span 306 amplify the optical signals traveling over fiber span 306. The 269.2 mW portion and the 260 mW portion provide at least a 6 dB gain in the optical signals in fiber span 306. Preferably, the gain is 10 dB or more. Likewise, in fiber span 310, the 269.2 mW portion backward propagating over fiber span 310 and the 260 mW portion forward propagating over fiber span 310 amplify the optical signals traveling over fiber span 310. The 269.2 mW portion and the 260 mW portion provide at least a 6 dB gain in the optical signals in fiber span 310.

In fiber spans 306 and 310, energy is transferred between the counter-propagating pumps. The same gain (about 10 dB) may be achieved in communication system 300 as in communication system 100 in FIG. 1 with about the same total pump power. Advantageously, the local pump power injected into each fiber span 306 and 310 is reduced by over half. In this example, the local pump power is reduced from 535.6 mW in communication system 100 in FIG. 1 to about 260 mW in communication system 300 in FIG. 3. Each fiber span 306, 310 receives a 269.2 mW light beam from one end and a 260 mW light beam from the other end. Thus, the local pump power from each end of a fiber span 306, 310 is about 260 mW, whereas the local pump power in the prior art is about 535 mW (see FIG. 1). The lower local pump power may be safer for the operators of communication system 300 while still providing the desired gain. The chances of burns or fires may be significantly reduced.

Raman gain by forward pumping also advantageously reduces noise accumulation. The OSNR improvement may be 6 dB with 0.5 dB resolution bandwidth. The reduced noise may improve transmission performance.

What is claimed is:

1. A communication system for distributed Raman amplification of optical signals, the communication system comprising:
   a first fiber span;
   a second fiber span;
   a third fiber span;
   a first pump system configured to generate and transmit a first light beam;
   a first splitter configured to receive the first light beam, split the first light beam into a first portion of the first light beam and a second portion of the first light beam, transfer the first portion of the first light beam onto the first fiber span to backward propagate over the first fiber span, and transfer the second portion of the first light beam onto the second fiber span to forward propagate over the second fiber span;
   a second pump system configured to generate and transmit a second light beam; and
   a second splitter configured to receive the second light beam, split the second light beam into a first portion of the second light beam and a second portion of the second light beam, transfer the first portion of the second light beam onto the second fiber span to backward propagate over the second fiber span, and transfer the second portion of the second light beam onto the third fiber span to forward propagate over the third fiber span;
   wherein a power of the first portion of the first light beam is not equal to a power of the second portion of the first light beam; and
   wherein a power of the first portion of the second light beam is not equal to a power of the second portion of the second light beam.

2. The communication system of claim 1 wherein the first pump system and the second pump system are configured to generate at least a 6 dB gain in the second fiber span.

3. The communication system of claim 1 wherein the first pump system comprises at least one laser diode configured to generate the first light beam.

4. The communication system of claim 1 wherein the first splitter system comprises about a 3 dB splitter.

5. The communication system of claim 1 wherein the first fiber span comprises a span of transmission fiber having a length between about 50 km and 120 km.

6. The communication system of claim 1 wherein the first portion of the first light beam comprises between about 40 to 49.5 percent or 51.5 to 60 percent of the power of the first light beam.

7. The communication system of claim 1 wherein the power of the first portion of the first light beam is less than about 300 mW.

8. The communication system of claim 1 wherein the power of the second portion of the first light beam is less than about 300 mW.

9. A method of operating a communication system for distributed Raman amplification of optical signals, wherein the communication system comprises a first fiber span, a second fiber span, a third fiber span, a first pump system, a first splitter system, a second pump system, and a second splitter system, the method comprising:
   receiving the optical signals in the first fiber span, the second fiber span, and the third fiber span;
   in the first pump system,
      generating a first light beam, and
      transmitting the first light beam to the first splitter system;

in the first splitter system,
- receiving the first light beam from the first pump system,
- splitting the first light beam into a first portion of the first light beam and a second portion of the first light beam,
- transferring the first portion of the first light beam onto the first fiber span to backward propagate over the first fiber span, and
- transferring the second portion of the first light beam onto the second fiber span to forward propagate over the second fiber span;

in the second pump system,
- generating a second light beam, and
- transmitting the second light beam to the second splitter system; and in the second splitter system,
- receiving the second light beam from the second pump system,
- splitting the second light beam into a first portion of the second light beam and a second portion of the second light beam,
- transferring the first portion of the second light beam onto the second fiber span to backward propagate over the second fiber span, and
- transferring the second portion of the second light beam onto the third fiber span to forward propagate over the third fiber span;

wherein a power of the first portion of the first light beam is not equal to a power of the second portion of the first light beam; and wherein a power of the first portion of the second light beam is not equal to a power of the second portion of the second light beam.

10. The method of claim 9 wherein the first pump system and the second pump system are configured to generate at least a 6 dB gain in the second fiber span.

11. The method of claim 9 wherein the first splitter system comprises about a 3 dB splitter.

12. The method of claim 9 wherein the first pump system comprises at least one laser diode configured to generate the first light beam.

13. The method of claim 9 wherein the first fiber span comprises a span of transmission fiber having a length between about 50 km and 120 km.

14. The method of claim 9 wherein the first portion of the first light beam generated by the first splitter system comprises between about 40 to 49.5 percent or 51.5 to 60 percent of the power of the first light beam.

15. The method of claim 9 wherein the power of the first portion of the first light beam is less than about 300 mW.

16. The method of claim 9 wherein the power of the second portion of the first light beam is less than about 300 mW.

* * * * *